(12) United States Patent
Laknin et al.

(10) Patent No.: US 8,702,006 B2
(45) Date of Patent: Apr. 22, 2014

(54) MICROCIRCUIT CARD BODY FORMING A MEDIUM FOR TWO ELECTRONIC LABELS WHICH ACTIVATE INDEPENTLY BASED ON CARD BODY FACE

(75) Inventors: Mourad Laknin, Vitre (FR); Julien Fortel, Vitre (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 12/953,398

(22) Filed: Nov. 23, 2010

(65) Prior Publication Data

US 2011/0121084 A1 May 26, 2011

(30) Foreign Application Priority Data

Nov. 25, 2009 (FR) ...................................... 09 58343

(51) Int. Cl.
*G06K 19/06* (2006.01)
(52) U.S. Cl.
USPC ...................................................... 235/492
(58) Field of Classification Search
USPC ...................................................... 235/492
See application file for complete search history.

(56) References Cited

U.S. PATENT DOCUMENTS

| | | | | |
|---|---|---|---|---|
| 6,641,049 B2* | 11/2003 | Luu | ............................... | 235/492 |
| 6,766,959 B2* | 7/2004 | Kakinoki | ....................... | 235/492 |
| 7,044,388 B2* | 5/2006 | Kamiya et al. | ................ | 235/492 |
| 2006/0125640 A1 | 6/2006 | Oakes et al. | | |
| 2007/0007345 A1* | 1/2007 | Tuttle | ............................ | 235/435 |
| 2007/0145155 A1* | 6/2007 | Scarlatella | .................... | 235/492 |
| 2009/0134218 A1* | 5/2009 | Yuzon et al. | ................. | 235/382 |
| 2010/0308965 A1* | 12/2010 | Weitzhandler et al. | ...... | 340/10.1 |

FOREIGN PATENT DOCUMENTS

| | | |
|---|---|---|
| FR | 2 835 338 | 8/2003 |
| WO | WO 03/030093 | 4/2003 |
| WO | WO 2009/080126 | 7/2009 |

OTHER PUBLICATIONS

Everett, David B. "Tutorial—Introduction to Smart Cards", Nov. 1992. [retrieved on Jan. 12, 2012] Retrieved from the Internet: <URL: http://web.archive.org/web/20041112060442/http://www.smartcard.co.uk/tutorials/sct-itsc.pdf>.*

* cited by examiner

*Primary Examiner* — Thien M Le
*Assistant Examiner* — Toan Ly
(74) *Attorney, Agent, or Firm* — Cozen O'Connor

(57) ABSTRACT

A microcircuit card body-based device with first and second electronic labels, the labels having respective first and second near-field electronic communications elements suitable for being activated by applying a magnetic field. The first and second labels also have respective first and second magnetic shielding elements placed, respectively, between a first face of the card body-based device and the first communications element and between a second face of the card body-based device and the second communications element in such a manner that applying the magnetic field to one of the faces of the body activates only one of the first and second communications elements.

20 Claims, 1 Drawing Sheet

MICROCIRCUIT CARD BODY FORMING A MEDIUM FOR TWO ELECTRONIC LABELS WHICH ACTIVATE INDEPENTLY BASED ON CARD BODY FACE

RELATED APPLICATIONS

This application claims the priority of French patent application no. 09/58343, the entire content of which is hereby incorporated by reference.

FIELD OF THE INVENTION

The present invention relates to the technical field of contactless type electronic labels.

BACKGROUND OF THE INVENTION

The term "electronic label" is used to designate an assembly comprising a medium, and a communications circuit of the near-field communication (NFC) type or of the radio frequency identity (RFID) type for enabling contactless communication to be established with an external device.

By way of example, such a communications circuit comprises an electronic chip and a near-field communications antenna. The antenna is generally connected to the electronic chip and serves not only as contactless communications means, but also to deliver the energy required for powering the electronic chip.

It is known to form the medium for the electronic label in a pre-cut portion of a smart card body of standardized format. Generally, smart card bodies have a format defined by a standard, e.g. the ISO-7816 standard. By way of example, the conventional format for bank cards is the ID-1 format of that standard.

This makes it possible in particular to take advantage of existing production machine tools that are adapted to the standard smart card format in order to fabricate such electronic labels even if the format of the labels is not standardized.

At the end of the fabrication steps or when selling a product, the portion defining the medium for the electronic label is separated and the surplus plastics material surrounding the medium is discarded.

This is particularly expensive and is not ecological, particularly since the medium of the electronic label generally represents less than half the total surface area of the card body from which it is cut out.

In an attempt to comply with present-day economic and ecological constraints, one solution consists in forming at least two labels in a single card body. Under such circumstances, the card body carries two near-field communications circuits, one for each label, each circuit comprising in particular a microcircuit and a near-field communications antenna.

Unfortunately, the presence of two circuits gives rise to a particular drawback during the steps of electronically personalizing electronic labels. The term "electronic personalization" is used to mean specifically incorporating data into a memory of the microcircuit, said data corresponding for example to identity data of a future user of the label.

During electronic personalization of labels, data specific to each label is transferred to the microcircuit of each label by means of a magnetic field emitted by external equipment. In order to optimize the time taken for personalization, the card body is brought under the external equipment that emits the magnetic field. There is then a significant risk of the magnetic field emitted by the reader reaching both labels simultaneously, even though only one of them should be reached in order to receive the data that is specifically intended for that one alone.

Consequently, at the end of those steps, doubt may remain as to the personalization that has actually been achieved for each of the labels.

SUMMARY OF THE INVENTION

One object of the invention is to provide a simple solution that enables production costs and material waste to be reduced, while enabling electronic labels to be personalized in specific manner.

To this end, one aspect of the invention is directed to an electronic device comprising a card body having a microcircuit and forming a medium for at least first and second electronic labels, the labels having respective first and second near-field electronic communications means suitable for being activated by applying a magnetic field, wherein the first and second labels also include respective first and second magnetic shielding means placed respectively between a first face of the body and the first communications means and between a second face of the body and the second communications means in such a manner that applying the magnetic field to one of the faces of the body activates only one of the first and second communications means.

The magnetic shielding means enable the labels to be personalized independently of each other. While electronically personalizing a label by applying a magnetic field to one face of the card body, the magnetic field can reach only one of the two communications means since the other communications means are protected by the shielding means disposed between the face of the body and the communications means. Thus, to personalize both labels, it is necessary to turn the card over. There is thus no longer any ambiguity as to the personalization that has actually been performed on each label.

Furthermore, such electronic labels may find a particularly advantageous application in fitting to articles that present metal surfaces, e.g. such as mobile telephone terminals. By way of example, the electronic label is stuck directly onto the body of the mobile terminal and is protected from the magnetic influence generated by the metal surface because of the magnetic shielding means that serve to limit the influence of the environment including the metal portions on any communication that might be established between the label and an external specialized reader.

In addition to a contactless interface, such cards may also include a physical interface with external contact.

A device according to an embodiment of the invention may also include one or more of the following characteristics:
the communications means and the shielding means are arranged one above the other in the thickness direction of each of the labels, each of the labels being defined by a first face for reading purposes facing the communications means, and a second face for magnetic shielding purposes facing the shielding means;
the second face of each label is provided with an adhesive coating for adhesively bonding the label to an article;
the electronic labels are placed one beside the other in a longitudinal direction of the card body;
the card body is in the ID-1 format of the ISO-7816 standard;
the card body is provided with a line of weakness separating at least two zones each, carrying a respective electronic label;
each electronic label is pre-cut in the card body;

the magnetic shielding means comprise a layer of ferrite;

the near-field communications means comprise a near-field communications antenna and a microcircuit connected to the antenna;

for each electronic label, the shielding means cover all or part of the area of the antenna; and the card body is made of a plastics material.

Another aspect of the invention is directed to a method of fabricating an electronic device of the invention, the method including a step of personalizing at least the first label by applying a magnetic field to the card body, wherein the card body is turned over in order to personalize the second label.

BRIEF DESCRIPTION OF THE DRAWINGS

Other characteristics and advantages of the invention appear in the light of the following description made with reference to the accompanying drawing, in which.

BRIEF DESCRIPTION OF THE DRAWINGS

Figure 1:
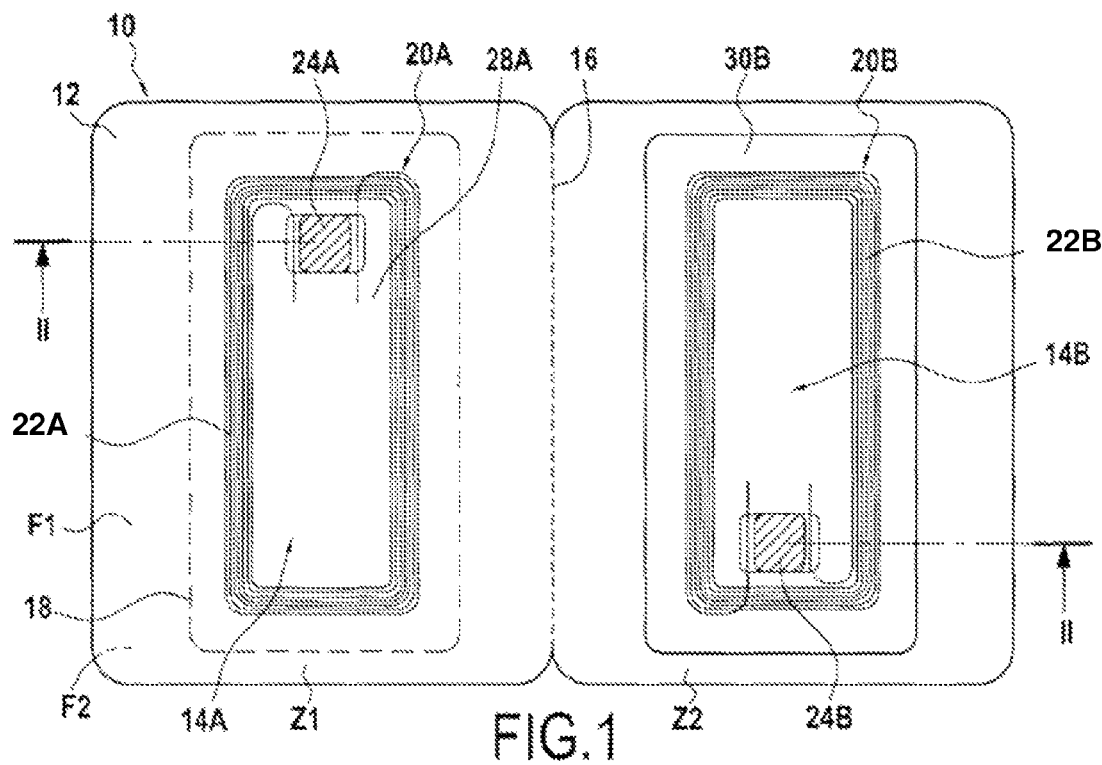
FIG. 1 shows an electronic device according to an embodiment of the invention forming a medium for two contactless electronic labels.

FIG. 1 shows an electronic device of the invention. The device is given overall reference 10.

The device 10 comprises a microcircuit card body 12. The card body 12 defines outside dimensions that comply for example with the ID-1 format of the ISO 7816 standard. In accordance with that standard, the dimensions of the body 12 are thus 85.60 millimeters by 53.98 millimeters. This format is conventionally used for bank cards. Preferably, the body 12 is made for example out of a plastics material such as polycarbonate, polyvinylchloride (PVC), etc.

More particularly, the body 12 forms a medium for at least first and second electronic labels 14A and 14B.

Preferably, these electronic labels 14A, 14B are placed one beside the other in a longitudinal direction of the card body 12. For example, the dimensions of each label 14A, 14B are 48 millimeters by 25 millimeters.

Figure 2:
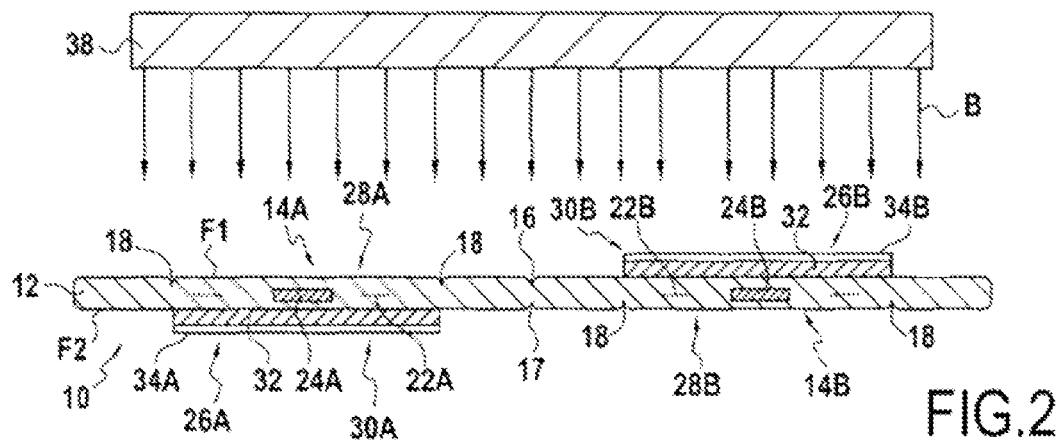
FIG. 2 is a diagram showing a step of personalizing one of the labels of FIG. 1.

In addition, in the example described, the card body 12 is provided with a line of weakness 16 between at least two zones Z1, Z2 each carrying one of the electronic labels 14A, 14B. By way of example, this line of weakness 16 comprises two score lines 17 of V-shaped profile, one in each of the faces F1, F2 of the body 12 and both in register with each other (FIGS. 1 and 2).

In a variant not shown, the line of weakness 16 may comprise a single score line made in only one of the faces F1 or F2, but to a greater depth. The line of weakness 16 in the example described is a middle line of the card body 12 between two zones Z1 and Z2 of substantially equal areas, and each of the labels 14A, 14B is substantially centered in its respective zone Z1, Z2.

Furthermore, each label 14A, 14B is pre-cut in the card body 12. For example, the card body 12 has lines 18 of perforations defining respectively the first and second labels 14A, 14B. These perforation lines 18 may surround the labels 14A, 14B completely or in part so as to make them easier to separate from the card body 12.

Below, the numerical references for examples that are associated with the first label 14A carry an index A while the elements associated with the second label 14B carry an index B. In the description below, the label 14A is described in detail. Naturally, the detailed description for the label 14A applies equally to the label 14B.

The first label 14A also includes first near-field electronics communications means 20A suitable for being activated by applying a magnetic field B. In this example, the communications means 20A comprise a near-field communications antenna 22A and a microcircuit 24A connected to the antenna 22A. The communications means 20A are suitable for communicating with external equipment, such as a specialized reader, e.g. in compliance with the near-field communications protocol as defined by the ISO 14 443 standard.

In general, in order to establish contactless communication with remote equipment such as a specialized reader, the label 14A does not have its own independent power supply and it receives energy from the reader with which it communicates in the form of electromagnetic signals.

In known manner, the microcircuit 24A of the label 14A connected to the antenna 22A transmits the information to the reader by the retro-modulation technique. Using this technique, the microcircuit 24A varies the load it presents as a function of the data to be transmitted, thereby modifying the overall magnetic field B.

Preferably, the antenna 22A comprises a plurality of turns wound around the periphery of the medium of the label 14A, thereby defining an antenna area S (FIG. 1).

More precisely, and in accordance with the invention, the first and second labels 14A and 14B also have respective first and second magnetic shielding means 26A and 26B. These means 26A and 26B serve in particular to prevent transmission of the magnetic field to the respective communications means 20A and 20B.

Preferably, the magnetic shielding means 26A, 26B cover all or part of the area S of the antenna 22A, 22B of each label 14A, 14B.

Preferably, the communications means 20A and the shielding means 26A are arranged one above the other in the thickness direction of the label 14A, the label 14A defining a first face 28A for reading purposes facing the communications means 20A, and a second face 30A for magnetic shielding purposes facing the shielding means 26A.

For example, the shielding means 26A comprise a layer of a material 32 essentially comprising ferrite. In the example described, the layer of material 32 is substantially 200 micrometers (μm) thick and presents magnetic permeability of 110.

Preferably, the second face 30A, 30B for magnetic shielding of each label 14A, 14B is provide with an adhesive coating 34A, 34B to enable the label 14A, 14B to be applied to an article by adhesive bonding. For example, the coating 34 comprises a layer of adhesive provided with a non-adhesive protective film that can be removed prior to bonding.

In addition, and more precisely as can be seen in FIG. 2, the first and second shielding means 26A and 26B are arranged respectively between a first face F1 of the body 12 and the first communications means 20A and between a second face F2 of the body 12 and the second communications means 20B. Thus, the shielding means 26A, 26B are arranged relative to each other in such a manner that applying a magnetic field B to one of the faces F1, F2 of the body 12 activates only one of the first and second communications means 20A and 20B.

Thus, as shown in FIG. 2, when the card body 12 carrying the two labels 14A, 14B is subjected to a magnetic field B coming from a specialized reader 38, e.g. a personalization device, only one of the two labels can establish contactless communication with the reader.

In the example shown in this figure, the magnetic field emitted by the reader is blocked by the magnetic shielding means 26B of the second label 14B, whereas the same magnetic field B is transmitted into the label 14A, thereby activating the communications means 20A of the first label 14A and establishing contactless communication with the reader.

Figure 3:
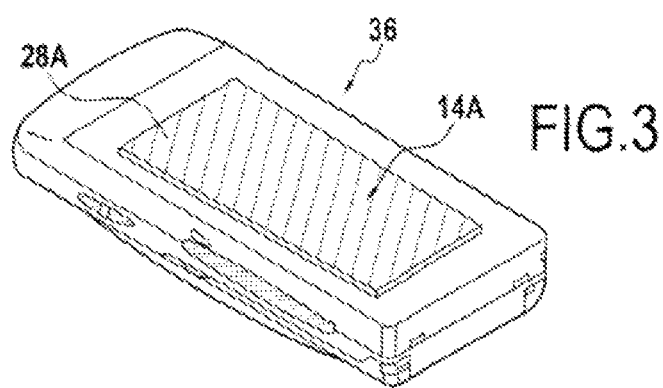
FIG. 3 shows a mobile telephone carrying one of the contactless labels of the FIG. 1 device.

FIG. 3 shows the label 14A fitted to an article such as a mobile terminal 36 for providing the terminal 36 with a contactless payment function.

In this type of application, it is important to isolate the contactless payment function from any electronic and metallic environment of the mobile telephone, in particular the battery of the terminal or indeed a metal housing. The shielding means 26A thus also serve to enable the near-field communications circuits to operate properly even in the presence of metal in the environment close to its antenna.

There follows a description of the main operating aspects of a device of the invention.

Firstly, a card body 12 incorporating two antennas and two microcircuits is prepared. For example, the card body 12 is made by laminating layers together, with at least one of the layers incorporating the antennas and the microcircuits. Once the card body has been made, each electronic label 14A, 14B is personalized.

To personalize the first electronic label 14A, the card body 12 is passed under the specialized reader with its first face F1 facing towards the reader 38. In this position, the read face 28A of the first label 14A and the shielding face 30B of the second label 14B face towards the reader. The magnetic field B emitted by the reader 38 for transmitting data specifically to the first label 14A reaches that label only while the field B is reflected by the second label 14B, and more precisely by the shielding means 26B.

Once the first label 14A has been personalized, a machine tool turns the card 10 over so that the second face F2 of the body 12 faces towards the reader 38. The situation is now inverted and the second label 14B is personalized.

Once the labels 14A, 14B have been personalized, the body 12 passes into a pre-cutting machine tool for forming the various notches defining the lines of weakness and of perforations 16 and 18. Optionally, these pre-cutting steps may be performed prior to personalization.

The electronic device 10 is then complete and may be sold as such, or it may be sold in the form of two independent sheets each carrying a respective label 14A, 14B, as obtained by separating the two zones Z1, Z2 along the line of weakness 16. Each label 14A, 14B may consequently be separated from the sheet in simple manner in order to be used.

In addition, such labels are entirely suited to being used in the close vicinity of a metal article, and they may even be placed without trouble on a metal support, such as a mobile telephone terminal.

Naturally, the above-described embodiments are not limiting in any way and may receive any desirable modification without going beyond the ambit of the invention. In particular, it would still be in accordance with the invention to form more than two labels in the card body, arranging them relative to one another in such a manner as to best limit the magnetic disturbances that will be generated when performing near-field personalization on one of the labels.

What is claimed is:

1. An electronic card body-based device comprising a card body forming a medium for at least first and second electronic labels, the labels having respective first and second near-field electronic communications means suitable for being activated by applying a magnetic field,
wherein the first and second labels also include respective first and second magnetic shielding means placed respectively between a first face of the card body-based device and the first communications means and between a second face of the card body-based device and the second communications means,
wherein the first face and the first shielding means are on a first side of the card body-based device, and the second face and the second shielding means are on a second side of the card body-based device, the second side of the card body-based device being opposite the first side of the card body-based device in a direction orthogonal to the first and second faces, and
wherein, irrespective of any intervening layers or components, components of the card body-based device, from the first face to the second face, are arranged as follows: the first face, the first magnetic shielding means, the first and second communications means, the second magnetic shielding means, and the second face.

2. The card body-based device according to claim 1, wherein the communications means and the shielding means are arranged one above the other in the thickness direction of each of the labels, each of the labels being defined by a first face for reading purposes facing the communications means, and a second face for magnetic shielding purposes facing the shielding means.

3. The card body-based device according to claim 2, wherein the second face of each label is provided with an adhesive coating for adhesively bonding the label to an article.

4. The card body-based device according to claim 1, wherein the electronic labels are placed one beside the other in a longitudinal direction of the card body.

5. The card body-based device according to claim 1, wherein the card body is in the ID 1 format of the ISO 7816 standard.

6. The card body-based device according to claim 1, wherein the card body is provided with a line of weakness separating at least two zones, each carrying a respective electronic label.

7. The card body-based device according to claim 1, wherein each electronic label is pre-cutout in the card body.

8. An electronic card body-based entity comprising a card body forming a medium for at least first and second tags, the tags having respective first and second near-field electronic communications means suitable for being activated by applying a magnetic field, wherein the first and second tags also include respective first and second magnetic shielding means placed respectively between a first face of the card body-based entity and the first communications means and between a second face of the card body-based entity and the second communications means, wherein the first face and the first shielding means are on a first side of the card body-based device, and the second face and the second shielding means are on a second side of the card body-based device, the second side of the card body-based device being opposite the first side of the card body-based device in a direction orthogonal to the first and second faces, wherein, irrespective of any intervening layers or components, components of the card body-based entity, from the first face to the second face, are arranged as follows: the first face, the first magnetic shielding means, the first and second communications means, the second magnetic shielding means, and the second face.

9. A method of personalizing an electronic label, comprising:
applying a magnetic field to a first face of an electronic card body-based device comprising a card body forming a medium for at least first and second electronic labels, the labels having respective first and second near-field electronic communications means suitable for being activated by applying a magnetic field, wherein the first and second labels also include respective first and second magnetic shielding means placed respectively between a first face of the card body-based device and the first communications means and between a second face of the card body-based device and the second communications means;

applying a magnetic field to a second face of the electronic card body-based device; and separating two zones of the device, after the applying of the magnetic field to the first and second faces, each zone carrying one of the at least first and second electronic labels.

10. The method of personalizing an electronic label according to claim 9, wherein the communications means and the shielding means are arranged one above the other in the thickness direction of each of the labels, each of the labels being defined by a first face for reading purposes facing the communications means, and a second face for magnetic shielding purposes facing the shielding means.

11. A method of fabricating an electronic card body-based device comprising personalizing an electronic label according to the method of claim 9.

12. The method of personalizing an electronic label according to claim 9, further comprising providing the second face of each label with an adhesive coating for adhesively bonding the label to an article.

13. The method of personalizing an electronic label according to claim 9, wherein the electronic labels are placed one beside the other in a longitudinal direction of the card body.

14. The method of personalizing an electronic label according to claim 9, wherein the card body is in the ID 1 format of the ISO 7816 standard.

15. The method of personalizing an electronic label according to claim 9, further comprising providing the card body with a line of weakness separating at least two zones, each carrying a respective electronic label.

16. The method of personalizing an electronic label according to claim 9, wherein each electronic label is pre-cutout in the card body.

17. The method of personalizing an electronic label according to claim 9, wherein the magnetic shielding means comprise a layer of ferrite.

18. The method of personalizing an electronic label according to claim 9, wherein the near-field communications means comprise a near-field communications antenna and a microcircuit connected to the antenna.

19. The method of personalizing an electronic label according to claim 18, wherein, for each electronic label, the shielding means cover all or part of the area of the antenna.

20. The method of personalizing an electronic label according to claim 9, wherein the card body is made of a plastics material.

* * * * *